United States Patent [19]

Cooper

[11] Patent Number: 5,676,416
[45] Date of Patent: Oct. 14, 1997

[54] AUTOMOTIVE VEHICLE SLIDING DOOR INTERLOCK MECHANISM

[75] Inventor: Geoffrey John Cooper, Canton, Mich.

[73] Assignee: Ford Global Technologies, Inc., Dearborn, Mich.

[21] Appl. No.: 686,877

[22] Filed: Jul. 26, 1996

[51] Int. Cl.⁶ .................................................. B62D 25/00
[52] U.S. Cl. .................. 296/97.22; 296/155; 292/DIG. 46
[58] Field of Search ................................... 296/97.22, 155; 180/286, 289; 292/DIG. 65, DIG. 46

[56] References Cited

U.S. PATENT DOCUMENTS

| | | |
|---|---|---|
| 3,788,685 | 1/1974 | Leichtl . |
| 3,912,311 | 10/1975 | Carvell et al. . |
| 4,620,744 | 11/1986 | Yui et al. ................. 296/155 |
| 5,454,618 | 10/1995 | Sullivan ................. 296/97.22 |
| 5,520,431 | 5/1996 | Kapes et al. ............ 296/97.22 |
| 5,538,312 | 7/1996 | Lehmkuhl ............... 296/97.22 |

FOREIGN PATENT DOCUMENTS

| | | |
|---|---|---|
| 0 102 481 | 7/1983 | European Pat. Off. . |
| 0 531 179 A1 | 7/1992 | France . |
| 59-11918 | 7/1982 | Japan . |

*Primary Examiner*—Joseph D. Pape
*Attorney, Agent, or Firm*—David B. Kelley

[57] ABSTRACT

An interlock mechanism, for an automotive vehicle having a fuel filler door and a sliding door on a same side of the vehicle body, has a sensor mounted proximate the filler door for sensing movement thereof, a latch for releasably latching the sliding door in a closed position when the filler door is open, and a cable connected between the sensor and the latch for communicating the position of the filler door to the latch. The latch has a cam member mounted to the vehicle body, a pivotable hook for preventing movement of the cam when the filler door is open and disengaged from the cam member when the filler door is closed, and a key extending from the sliding door for engagement with the cam member when the sliding door is in a closed position and for disengagement from the cam member when the sliding door is moved to an open position. The sliding door is locked in a closed position when the filler door is opened.

16 Claims, 5 Drawing Sheets

5,676,416

AUTOMOTIVE VEHICLE SLIDING DOOR INTERLOCK MECHANISM

FIELD OF THE INVENTION

The present invention relates to vehicle sliding doors in general, and more specifically to an interlock mechanism for a vehicle sliding door.

BACKGROUND OF THE INVENTION

A design option for vehicles with sliding doors, particularly vans, positions a sliding door on the same side of the vehicle as the fuel filler pipe access lid. Such a design raises the possibility of a collision between the sliding door and the filler pipe access lid if the access lid is open for refueling and the sliding door is subsequently opened. Two mechanisms to obviate this potentiality, based on sliding door track lockout mechanisms, were disclosed in U.S. Pat. No. 5,454,618 (Sullivan) and patent application Ser. No. 08/368,946, now U.S. Pat. No. 5,538,312 both assigned to the assignee of the present application and incorporated by reference herein. These door track lockout mechanisms operate by having a stop member and a link, respectively, mounted for alternate movement into and out of a door track to obstruct and unobstruct movement of the sliding door rollers therethrough.

Other mechanisms for preventing an undesirable collision between a door and a fuel filler access lid are shown in Japanese patent 103,511 and U.S. Pat. No. 4,620,744 (Yui, et al.). A drawback of the former approach is that the door will cause chipping, nicking, and denting of the access lid upon collision therewith thus degrading vehicle external appearance. The latter mechanism requires opening the fuel filler lid and then pulling a lever to lock-out the sliding door, an inconvenient extra step. In addition, the mechanism only allows the door to open a short way and also requires many parts which increase both manufacturing expense and assembly time.

SUMMARY OF THE INVENTION

The present invention advances the field and overcomes the disadvantages of the related art by providing an interlock mechanism, for an automotive vehicle having a fuel filler door and a sliding door on a same side of the vehicle body, which does not depend on a door track stop or link to obstruct movement of a vehicle sliding door within a sliding door track. Lockout of the sliding door is provided when the filler door is opened. The sliding door interlock mechanism has a sensor mounted proximate a hinge of the filler door for sensing movement thereof, a latch for releasably latching the sliding door in a closed position when the filler door is open, and a cable connected between the sensor and the latch for communicating the position of the filler door to the latch. The latch has a cam member mounted to the vehicle body, cam stop means for preventing movement of the cam when the filler door is open and disengaged from the cam member when the filler door is closed, and cam actuation means extending from the sliding door for engagement with the cam member when the sliding door is in a closed position and for disengagement from the cam member when the sliding door is moved to an open position. Preferably, the cam stop means is a pivotable hook biased to an unhooked position disengaged from the cam member when the filler door is closed and movable to a hooked position engaged with the cam member when the sensor senses that the filler door is open so as to prevent rotation of the cam member. The cam actuation means preferably comprises a key extending from a rear edge of the sliding door engaged with the cam member when the sliding door is in the closed position, the key rotating the cam member and disengaging therefrom when the hook is in the unhooked position and the sliding door is moved to the open position.

An advantage of the present invention is a sliding door interlock mechanism which does not depend on a door track stop or link to obstruct movement of a vehicle sliding door within a sliding door track.

Another advantage is an interlock mechanism having easily accessible parts to facilitate maintenance.

Still another advantage of the present invention is a sliding door interlock mechanism which can be inexpensively manufactured and easily assembled.

A feature of the present invention is a sliding door latch having a rotatable cam member having a notch portion, a finger portion, a pivotable hook biased to an unhooked position disengaged from the finger when the filler door is closed and movable to a hooked position engaged with the finger when the filler door is open so as to prevent rotation of the cam member.

Another feature is a key extending from a rear edge of the sliding door operative with a notch in the cam member which prevents movement of the sliding door when the hook is in the hooked position.

BRIEF DESCRIPTION OF THE DRAWINGS

These and other objects, advantages, and features of the present invention will be apparent to those skilled in the automotive body arts upon reading the following description with reference to the accompanying drawings, in which:

FIG. 4A is a cross-sectional view similar to FIG. 4 but showing the position of the latch mechanism when the filler door is moved to an open position;

DETAILED DESCRIPTION OF THE PREFERRED EMBODIMENT

Figure 1:
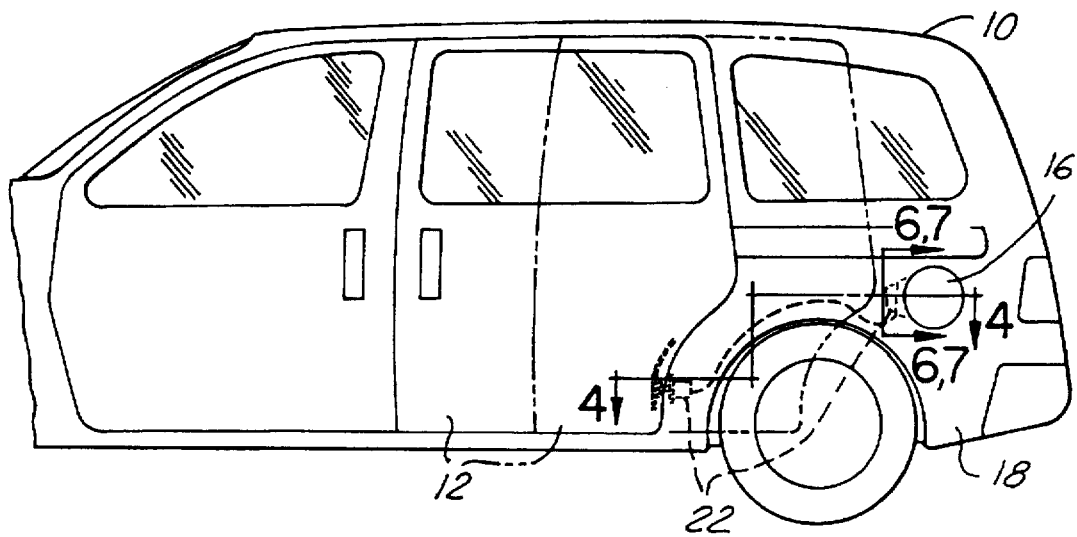
FIG. 1 is a side view of a vehicle body having a sliding door and a fuel filler access lid on the same side of the vehicle body and showing the location of an interlock mechanism according to a preferred embodiment of the present invention.
Figure 2:
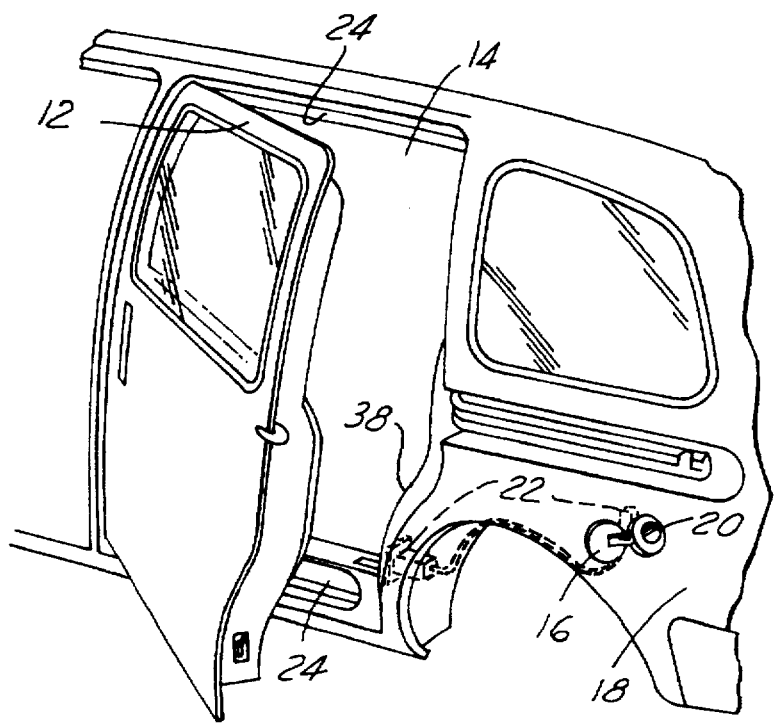
FIG. 2 is a perspective side view of a vehicle access and an adjacent rearward vehicle body section showing the location of an interlock mechanism according to the present invention.

Referring now to FIGS. 1 and 2, a vehicle body 10, for example in a van, has a sliding door 12 along a side thereof for alternately covering and uncovering passageway 14 (FIG. 2) to allow entry and egress therefrom. A fuel filler access lid 16 on a rear quarter panel 18 allows access to the filler pipe 20 during refueling. If the access lid 16 is opened for refueling and the sliding door 12 is slid open to uncover the passageway 14, a collision will occur unless the access lid 16 is shut or the sliding door 12 is locked (FIG. 1). Since a fuel pump filler nozzle (not shown) may be in filler pipe 20 when the sliding door 12 is opened, it is impractical to shut the access lid 16 in such situations. The present invention therefore provides a sliding door interlock mechanism 22 for sensing the position of the access lid 16 so as to obstruct movement of the sliding door 12 when the access lid 16 is open to thereby prevent the above-described collision.

As is known in the art, the sliding door 12 moves in longitudinally oriented tracks 24 located above, below and rearwardly of passageway 14 (FIG. 2). As the sliding door 12 is unlatched and pushed rearward, it is routed by rollers (not shown) within the tracks 24 slightly outward of the vehicle body 10 and slides adjacent to the rear quarter panel 18.

Figure 3:
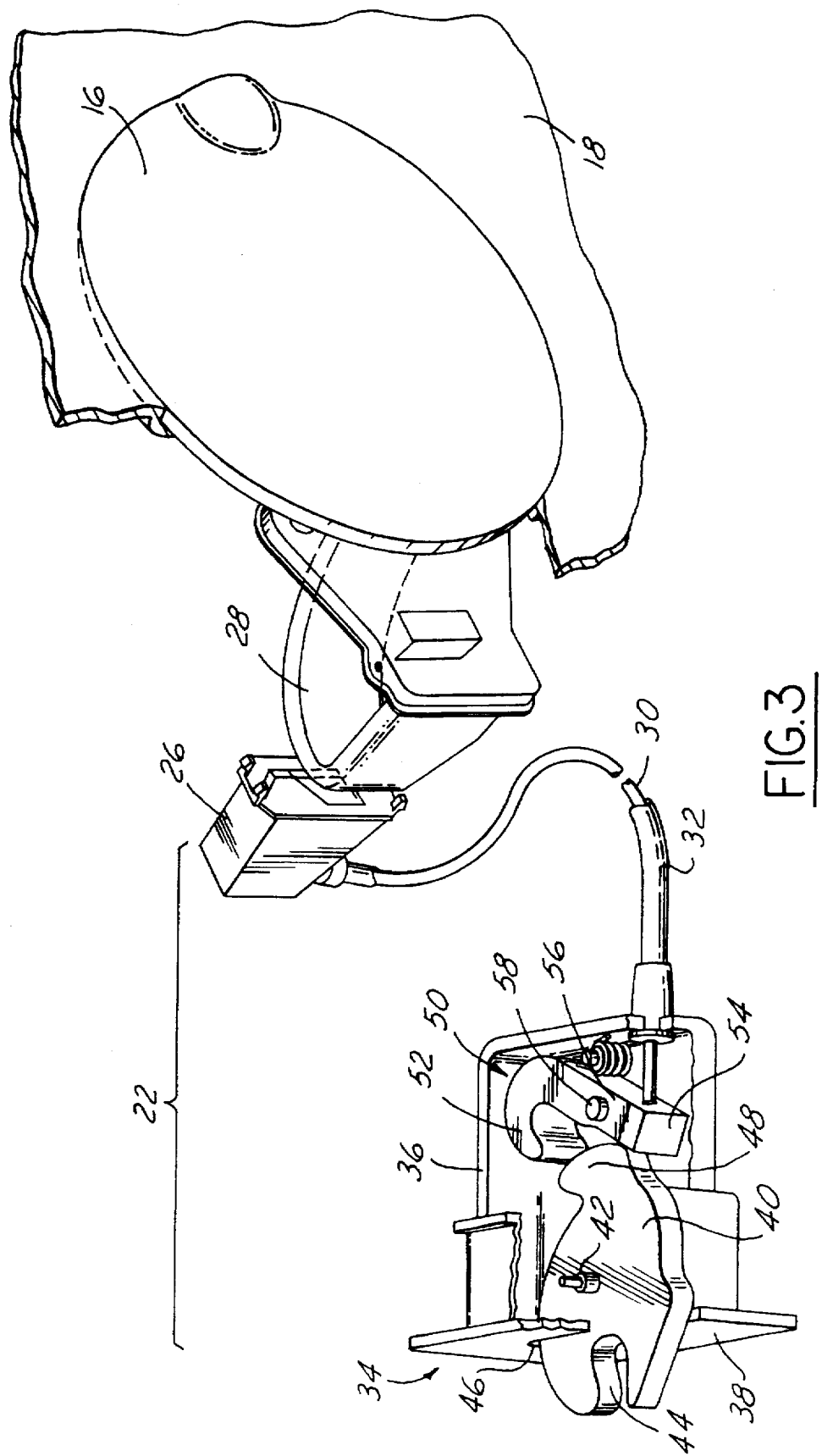
FIG. 3 is a perspective, partially cut away view of an interlock mechanism according to the present invention.

A preferred embodiment of the present invention will now be described with reference to FIGS. 3–7. As seen in FIG. 3, the interlock mechanism 22 has a filler door position sensor 26 mounted proximate a hinge 28 of the filler door 16. A cable 30, within a sheath 32, connects the filler door position sensor 26 with a sliding door latch 34. The sliding door latch 34 is contained in a housing 36, shown partially cut away in FIG. 3. The housing 36 is mounted within the vehicle body 10 adjacent a door interface edge 38 (FIGS. 2 and 3). The sliding door latch 34 has a cam member 40 rotatable about a pin 42 mounted to the housing 36. The cam member 40 has a notch portion 44 extending exteriorly from the vehicle body 10 through a slot 46 in the door interface edge 38 (FIG. 3). The cam member 40 also has a finger portion 48 extending away from the notch portion 44 and contained within the housing 36. As more fully described below, the sliding door latch 34 has a hook 50 with a hook portion 52 for interaction with the finger portion 48, a connection end 54 connected to the cable 30, and a center portion 56 having a pin 58 about which the hook 50 is pivoted. The hook 50 has an unhooked position (FIG. 5) disengaged from the finger portion 48 when the filler door 16 is closed. A torsional spring 60, mounted within the housing 36, biases the hook 50 to the unhooked position. The hook 50 is movable to a hooked position engaged with the finger portion 48 (FIG. 4A) when the filler door position sensor 26 senses that the filler door 16 is open, as shown in phantom in FIG. 4. In the hooked position of FIG. 4A, the hook 50 prevents the cam member 40 from rotating around pin 42.

Figure 4:
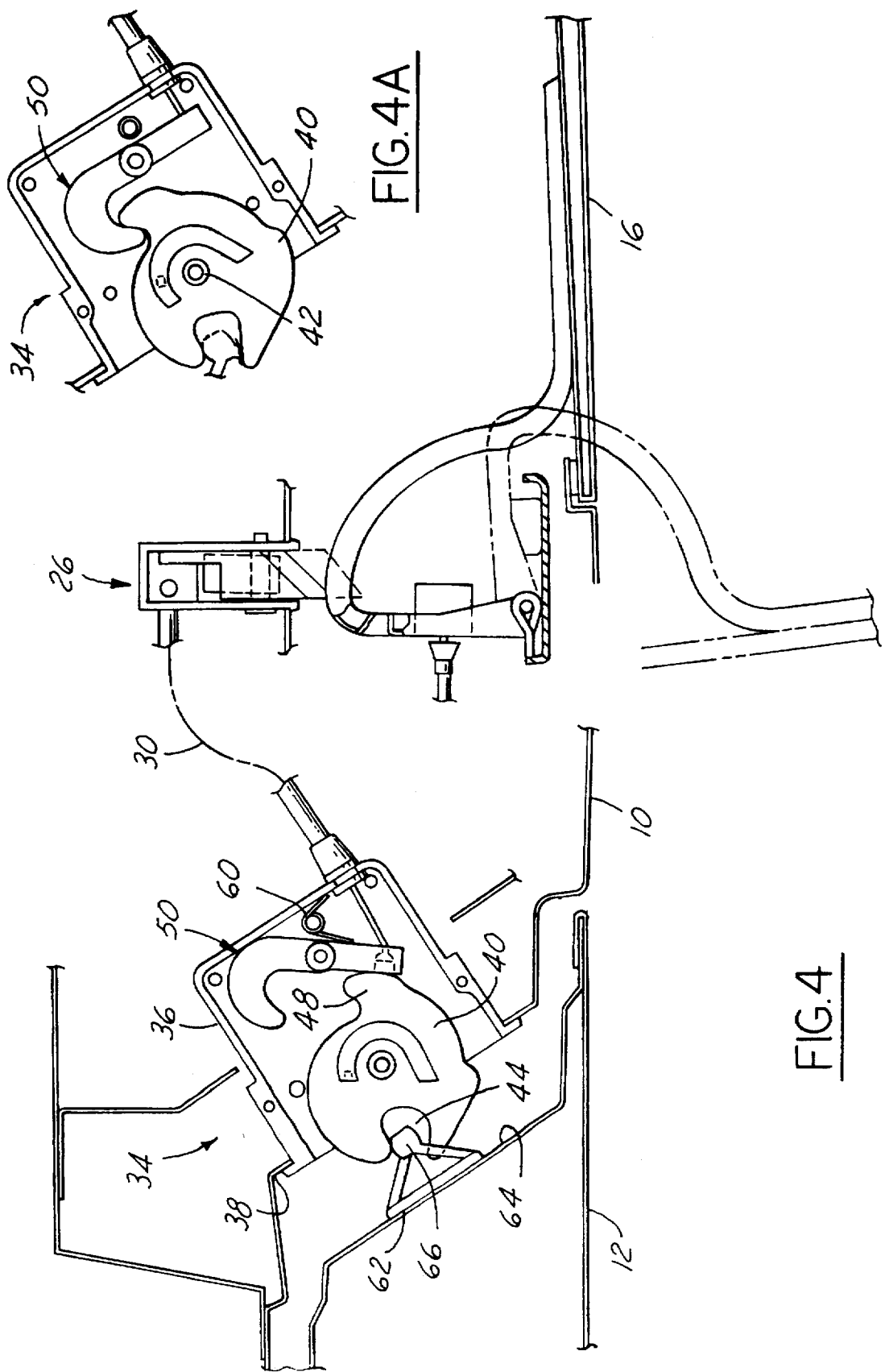
FIG. 4 is a cross-sectional view taken along line 4—4 of FIG. 1 showing the latch mechanism in a position allowing opening of the sliding door.

Latching of the sliding door 12 to the sliding door latch 22 is accomplished by a key 62 extending from a rear edge 64 of the sliding door 12. The key 62 has a head portion 66 engaged with the notch portion 44 of the cam member 40 when the sliding door 12 is in a closed position (FIG. 4).

Figure 5:
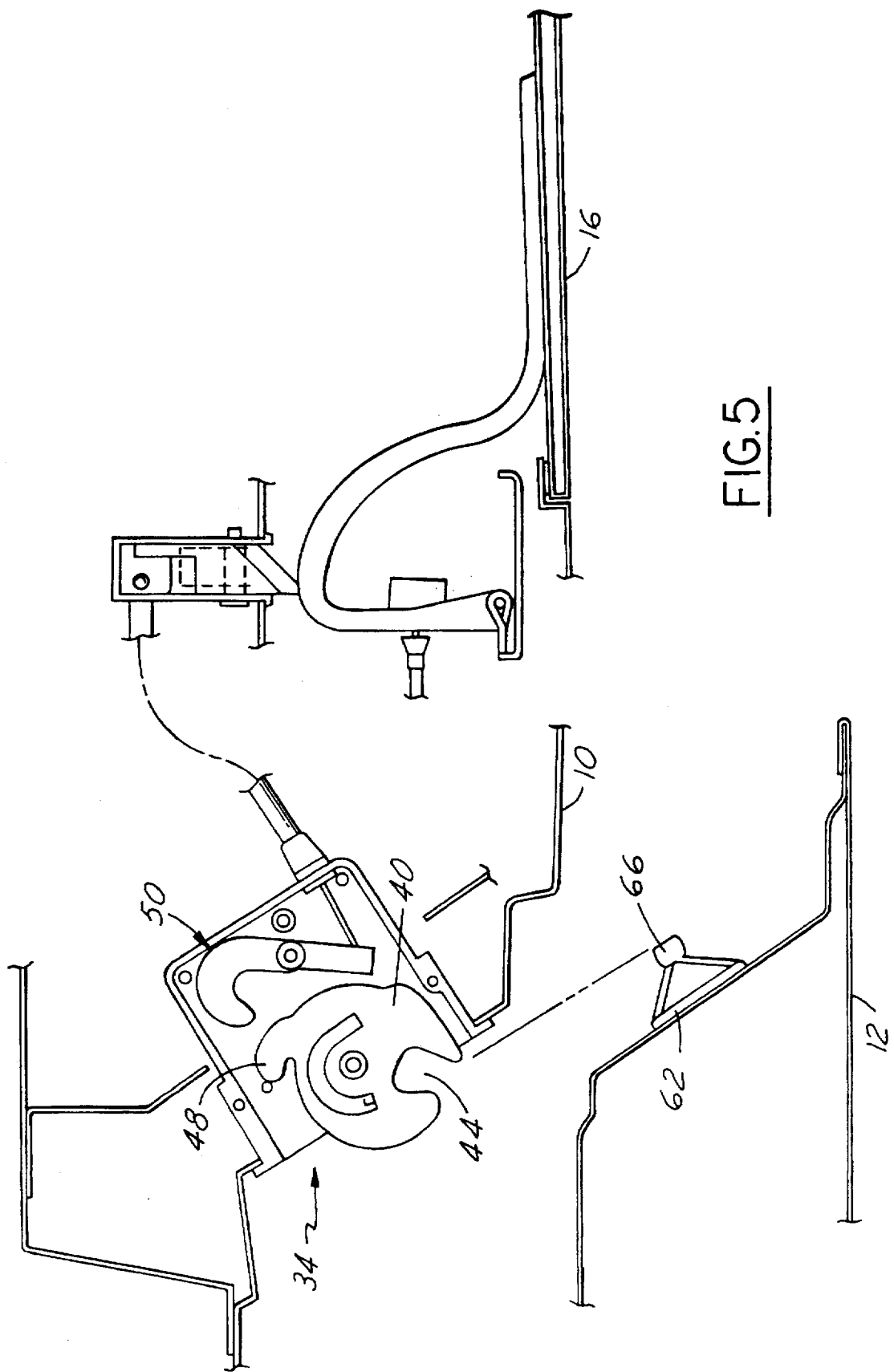
FIG. 5 is a cross-sectional view similar to FIG. 4 but showing the latch mechanism when the sliding door is moved to an open position.

When the filler door 16 is closed so that the hook 15 is disengaged from the finger portion 48 of the cam member 40, the sliding door 12 can be opened by outward displacement from the vehicle body 10, as seen in FIG. 5. When the sliding door 12 is moved to the open position, the head 66 of the key 62 rotates the cam member 40, in a counterclockwise direction in FIG. 5, and disengages from the notch 44 so that the sliding door 12 can move free of the sliding door latch 34. When the sliding door 12 is returned to the closed position (FIG. 4), the head 66 of the key 62 reengages the notch 44 of the cam member 40 and rotates it, in a clockwise direction, as seen in FIGS. 4 and 5, until the surface of the sliding door 12 is flush with the vehicle body 10 (FIG. 4).

Figure 6:
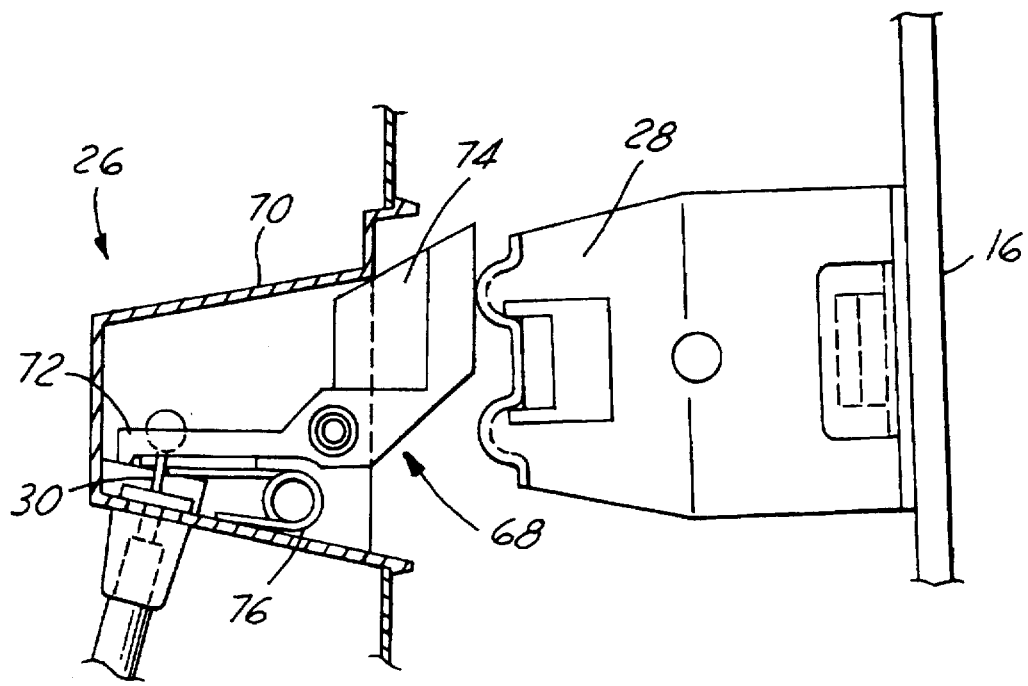
FIG. 6 is a cross-sectional view taken along line 6—6 of FIG. 1 and showing the position of an arm of the filler door position sensor when the filler door is closed.
Figure 7:
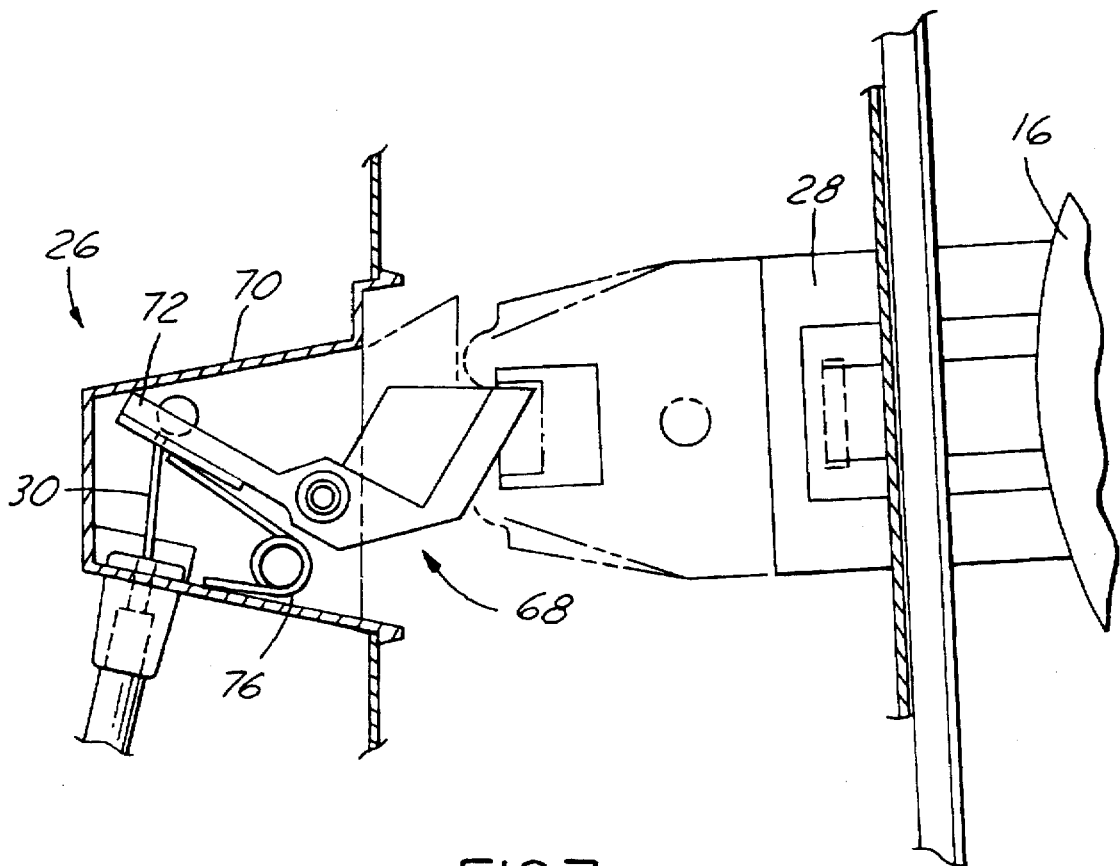
FIG. 7 is a cross-sectional view similar to FIG. 6 but showing the position of the filler door sensor arm when the filler door is open.

Turning now to FIGS. 6 and 7, operation of the filler door position sensor 26 is seen. When the filler door 16 is closed (FIG. 6), the hinge 28 contacts a sensor arm 68 which is pivotally mounted in a sensor housing 70 and has a cable end 72 connected to the cable 30 and a sensor end 74 for interaction with the hinge 28. The sensor arm 68 has a depressed position (FIG. 6) in which the sensor end 74 is depressed into the housing 70 by the hinge 28 when the filler door 16 is closed. In the depressed position, the cable end 72 moves the cable 30 so that the hook 50 can be biased to the unhooked position (FIG. 4). The sliding door 12 can thus be opened and a collision will not occur between the sliding door 12 and the filler door 16.

When the filler door 16 is opened (FIG. 7), the hinge 28 moves away from the filler door position sensor 26, the sensor arm 68 pivots within the housing 70 under the biasing force of a coil spring 76 so that the cable end 72 moves within the housing 70. This movement of the cable end 72 draws the cable 30 through the sheath 32 so that the hook 50 is moved to the latched position (FIG. 4A) to prevent rotation of the cam member 40, and thus prevent the sliding door 12 from moving to the open position. When the filler door is closed, the hinge 28 once again forces the sensor end to the depressed position (FIG. 6) and the hook 50 is moved to the unlatched position (FIG. 4). To facilitate the interaction of the hinge 28 with the sensor arm 68, the sensor end is preferably beveled.

Although the preferred embodiment of the present invention has been disclosed, various changes and modifications may be made without departing from the scope of the invention as set forth in the appended claims.

I claim:

1. A sliding door interlock mechanism for an automotive vehicle having a fuel filler door and a sliding door on a same side of a body of said vehicle, the interlock mechanism comprising:
    (a) filler door position sensor means for sensing the position of said filler door; and
    (b) latch means for releasably latching the sliding door in a closed position when the filler door is open, the latch means having:
        (i) a rotatable cam member mounted within the vehicle body adjacent a door interface edge, the cam member having:
            a notch portion extending exteriorly from said vehicle body; and
            a finger portion extending away from said notch portion interiorly of said vehicle body;
        (ii) a pivotable hook biased to an unhooked position disengaged from the finger when the filler door is closed and movable to a hooked position engaged with the finger when the filler door position sensor means senses that the filler door is open so as to prevent rotation of the cam member; and
        (iii) a key extending from a rear edge of the sliding door engaged with the notch portion when the sliding door is in the closed position, the key rotating the cam member and disengaging from the notch when the hook is in the unhooked position and the sliding door is moved to an open position.

2. A sliding door interlock mechanism according to claim 1 wherein the hook has a hook portion, a connection end, and is pivoted about a center portion thereinbetween.

3. A sliding door interlock mechanism according to claim 2 wherein the hook is biased to the unhooked position by a coil spring in contact with the connection end.

4. A sliding door interlock mechanism according to claim 2 wherein the filler door position sensor means comprises a sensor mounted proximate a hinge of the filler door for sensing movement of the hinge, and position communication means connected between the sensor and the latch means for communicating the position of the filler door to the latch means.

5. A sliding door interlock mechanism according to claim 4 wherein the position communication means comprises a cable connected on a first end to the sensor and on a second end to the connection end of the hook so that when the filler door is closed, the cable allows the hook to be biased to the unhooked position so that the sliding door may be moved to the open position, and when the filler door is open, the cable pulls the connection end of the hook against the bias force so as to move the hook to the hooked position thus preventing the sliding door from moving to the open position.

6. A sliding door interlock mechanism according to claim 5 wherein the sensor comprises a sensor arm pivotally mounted within a sensor housing and having a cable end connected to the first end of the cable and a sensor end for interaction with the hinge of the filler door.

7. A sliding door interlock mechanism according to claim 6 wherein the sensor arm has a depressed position in which the sensor end is depressed into the housing by the hinge of the filler door when closed so that the cable end positions the cable to move the hook to the unhooked position, and an extended position in which the sensor end is biased beyond the housing when the hinge moves away from the sensor as the filler door is opened so that the cable end draws the cable to move the hook to the hooked position.

8. A sliding door interlock mechanism according to claim 7 wherein the sensor end is beveled to facilitate interaction between the sensor arm and the hinge when the filler door is opened and closed.

9. A sliding door interlock mechanism for an automotive vehicle having a fuel filler door and a sliding door on a same side of a body of said vehicle, the interlock mechanism comprising:

(a) a sensor mounted proximate a hinge of the filler door for sensing movement thereof;

(b) latch means for releasably latching the sliding door in a closed position when the filler door is open, the latch means having:

(i) a rotatable cam member mounted within the vehicle body adjacent a door interface edge;

(ii) a pivotable hook biased to an unhooked position disengaged from the cam member when the filler door is closed and movable to a hooked position engaged with the cam member when the filler door position sensor means senses that the filler door is open so as to prevent rotation of the cam member; and (iii) a key extending from a rear edge of the sliding door engaged with the cam member when the sliding door is in the closed position, the key rotating the cam member and disengaging from the notch when the hook is in the unhooked position and the sliding door is moved to an open position; and (c) position communication means connected between the sensor and the latch means for communicating the position of the filler door to the latch means.

10. A sliding door interlock mechanism according to claim 9 wherein the cam member has a hook with a hook end, a connection end, and is pivoted about a center portion thereinbetween.

11. A sliding door interlock mechanism according to claim 10 wherein the hook is biased to the unhooked position by a coil spring in contact with the connection end.

12. A sliding door interlock mechanism according to claim 11 wherein the position communication means comprises a cable connected on a first end to the sensor and on a second end to the connection end of the hook so that when the filler door is closed, the cable allows the hook to be biased to the unhooked position so that the sliding door may be moved to the open position, and when the filler door is open, the cable pulls the connection end of the hook against the bias force so as to move the hook to the hooked position thus preventing the sliding door from moving to the open position.

13. A sliding door interlock mechanism according to claim 10 wherein the cam member has:

a notch portion for engaging and disengaging the key when the sliding door is moved between the closed position and the open position, respectively; and a finger portion for receiving the hook when the filler door is open so as to prevent rotation of the cam member.

14. A sliding door interlock mechanism for an automotive vehicle having a fuel filler door and a sliding door on a same side of a body of said vehicle, the interlock mechanism comprising:

(a) a sensor mounted proximate a hinge of the filler door for sensing movement thereof;

(b) a latch for releasably latching the sliding door in a closed position when the filler door is open, the latch having:

(i) a cam member mounted to the vehicle body;

(ii) cam stop means for preventing movement of the cam when the filler door is open and disengaged from the cam member when the filler door is closed; and (iii) cam actuation means extending from the sliding door for engagement with the cam member when the sliding door is in a closed position and for disengagement from the cam member when the sliding door is moved to an open position; and (c) a cable connected between the sensor and the latch for communicating the position of the filler door to the latch.

15. A sliding door interlock mechanism according to claim 14 wherein the cam stop means comprises a pivotable hook biased to an unhooked position disengaged from the cam member when the filler door is closed and movable to a hooked position engaged with the cam member when the sensor senses that the filler door is open so as to prevent rotation of the cam member.

16. A sliding door interlock mechanism according to claim 14 wherein the cam actuation means comprises a key extending from a rear edge of the sliding door engaged with the cam member when the sliding door is in the closed position, the key rotating the cam member and disengaging therefrom when the hook is in the unhooked position and the sliding door is moved to the open position.

* * * * *